United States Patent
Yamada et al.

(10) Patent No.: US 12,264,883 B2
(45) Date of Patent: Apr. 1, 2025

(54) HEAT EXCHANGER INCLUDING HEADER

(71) Applicant: DAIKIN INDUSTRIES, LTD., Osaka (JP)

(72) Inventors: Kouju Yamada, Osaka (JP); Tomoki Hirokawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 444 days.

(21) Appl. No.: 17/592,782

(22) Filed: Feb. 4, 2022

(65) Prior Publication Data

US 2022/0155016 A1 May 19, 2022

Related U.S. Application Data

(63) Continuation of application No. PCT/JP2020/029693, filed on Aug. 3, 2020.

(30) Foreign Application Priority Data

Aug. 6, 2019 (JP) .................................. 2019-144672

(51) Int. Cl.
F28D 7/16 (2006.01)
F28F 9/02 (2006.01)

(52) U.S. Cl.
CPC . F28D 7/16 (2013.01); F28F 9/02 (2013.01)

(58) Field of Classification Search
CPC ... F28D 7/16; F28F 9/02; F28F 9/0221; F28F 9/0224
See application file for complete search history.

(56) References Cited

U.S. PATENT DOCUMENTS 6,200,642 B1 * 3/2001 Kanai ................. B23K 35/288
427/455
6,679,319 B1 * 1/2004 Kato ....................... F25B 39/04
62/509
(Continued)

FOREIGN PATENT DOCUMENTS

JP S61-14074 A 1/1986
JP H4-363592 A 12/1992
(Continued)

OTHER PUBLICATIONS

International Preliminary Report on Patentability issued in corresponding International Patent Application No. PCT/JP2020/029693, mailed on Feb. 17, 2022 (8 pages).
(Continued)

*Primary Examiner* — Raheena R Malik
(74) *Attorney, Agent, or Firm* — Osha Bergman Watanabe & Burton LLP

(57) ABSTRACT

A heat exchanger includes: a header that guides a refrigerant; and an assembly of heat transfer tubes and fins that is connected to the header and that causes heat exchange between the refrigerant and a medium. The header includes: a first member having a first surface; a second member having a second surface that faces the first surface; and third member having a third surface that intersects with the first surface and the second surface. The first surface is joined with the second surface by a first brazing material having a first thickness. The third surface is joined with the first member by a second brazing material having a second thickness. The third surface is joined with the second member by the second brazing material. The first thickness is less than the second thickness. The first thickness is 0.2 mm or less.

8 Claims, 7 Drawing Sheets

(56) References Cited

U.S. PATENT DOCUMENTS

| | | | |
|---|---|---|---|
| 10,054,368 B2* | 8/2018 | Nishiyama | F28F 9/0278 |
| 10,378,833 B2* | 8/2019 | Higashiiue | F25B 41/00 |
| 2005/0284621 A1 | 12/2005 | Katoh et al. | |
| 2006/0162917 A1* | 7/2006 | Park | F28F 9/0221 |
| | | | 62/509 |
| 2016/0195335 A1* | 7/2016 | Nishiyama | F28D 1/05366 |
| | | | 165/174 |
| 2019/0170456 A1 | 6/2019 | Matsui et al. | |

FOREIGN PATENT DOCUMENTS

| | | |
|---|---|---|
| JP | 2006-10262 A | 1/2006 |
| WO | 2006/129598 A1 | 12/2006 |
| WO | 2015/004719 A1 | 1/2015 |
| WO | 2017/042867 A1 | 3/2017 |

OTHER PUBLICATIONS

International Search Report issued in corresponding International Application No. PCT/JP2020/029693, mailed on Sep. 15, 2020 (5 pages).
Extended European Search Report issued in corresponding European Patent Application No. EP 20849429.4 dated Aug. 25, 2022 (9 pages).

* cited by examiner

HEAT EXCHANGER INCLUDING HEADER

TECHNICAL FIELD

The present disclosure relates to a heat exchanger mounted on an air conditioner and including a header.

BACKGROUND

Patent Literature 1 (WO 2015/004719 A) discloses a heat exchanger including a stacked header. The stacked header includes a plurality of plate-shaped bodies. The plurality of plate-shaped bodies is made of alternately disposed bare materials and cladded materials. The bare materials have no brazing material applied thereto. In contrast, the cladded materials each have a brazing material applied thereto. The stacked header is manufactured by heating the plurality of plate-shaped bodies and melting the brazing materials.

Melting the brazing materials leads to reduction in thickness of the cladded materials. This reduces a gap between adjacent two of the plurality of stacked plate-shaped bodies. The plate-shaped bodies are thus shifted from the positions intended by the manufacturer to possibly cause refrigerant leakage.

SUMMARY

A heat exchanger according to one or more embodiments includes a header and a heat transfer member (i.e., assembly of heat transfer tubes and fins). The header guides a refrigerant. The heat transfer member is connected to the header and causes heat exchange between the refrigerant and a medium. The header includes a first member, a second member, and a third member. The first member has a first surface. The second member has a second surface facing the first surface. The third member has a third surface. The third surface intersects with the first surface and the second surface, and is joined to the first member and the second member. The first surface and the second surface are joined by a brazing material having a first thickness. The third surface and the first member are joined by a brazing material having a second thickness. The third surface and the second member are joined by a brazing material having a third thickness. The first thickness is less than the second thickness. The first thickness is less than the third thickness. The first thickness is 0.2 mm or less.

In this configuration, the brazing material disposed between the first surface and the second surface is 0.2 mm or less in thickness. The first surface and the second surface can thus be joined without preliminarily disposing any brazing material between the first surface and the second surface, so that the first member and the second member are less likely to shift relatively and the header is less likely to have refrigerant leakage.

DETAILED DESCRIPTION

First Embodiments (1) Overall Configuration

Figure 1:
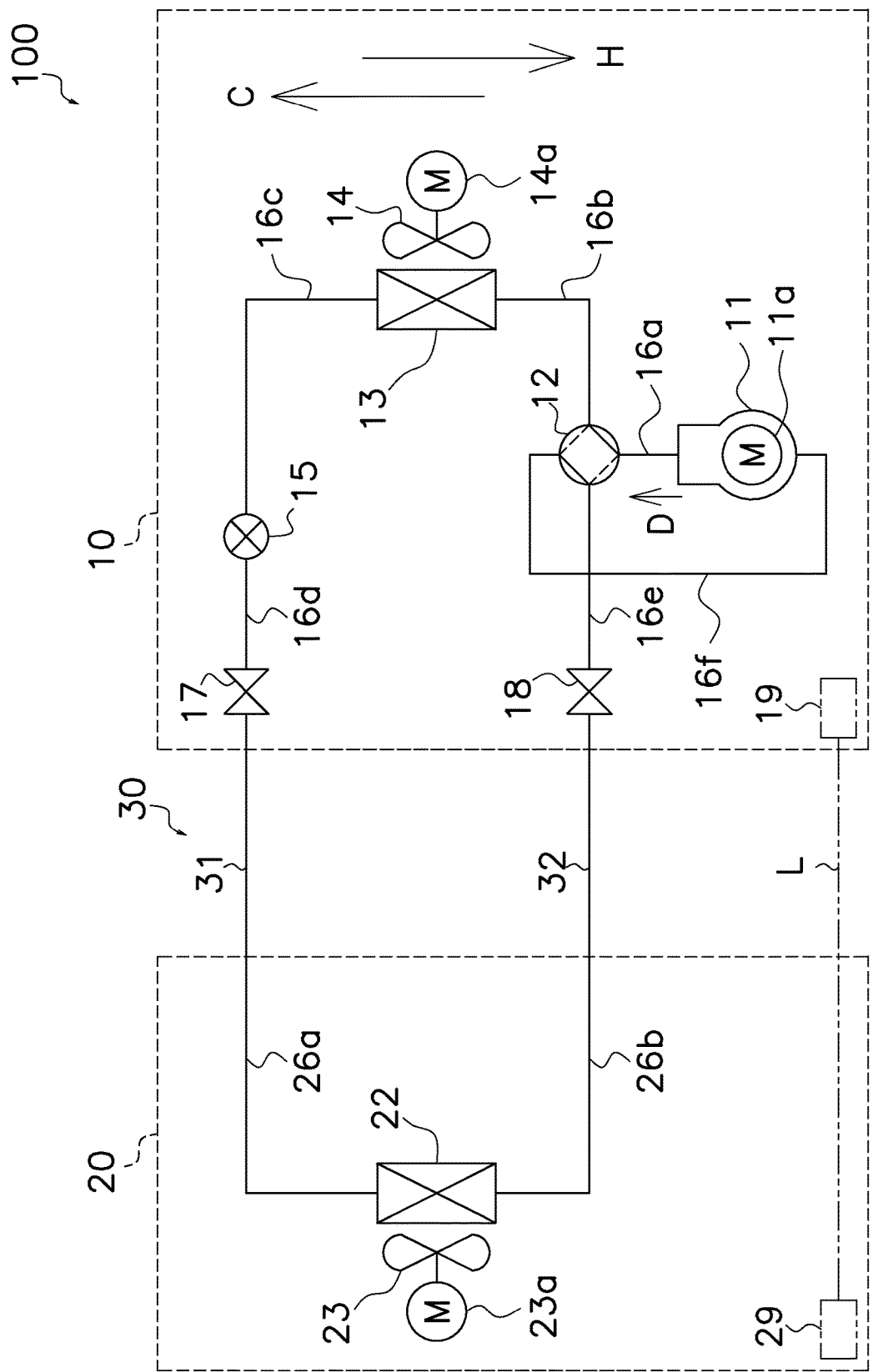
FIG. 1 is a circuit diagram of an air conditioner 100.

FIG. 1 is a circuit diagram of an air conditioner 100. The air conditioner 100 includes an outdoor unit 10, an indoor unit 20, and a connection piping 30. As to be described later, the outdoor unit 10 includes an outdoor heat exchanger 13 according to one or more embodiments.

(2) Detailed Configuration (2-1) Outdoor Unit 10

The outdoor unit 10 functions as a heat source. The outdoor unit 10 includes a compressor 11, a four-way switching valve 12, an outdoor heat exchanger 13, an outdoor fan 14, an expansion valve 15, a liquid shutoff valve 17, a gas shutoff valve 18, and an outdoor control unit 19. The outdoor unit further includes a plurality of inner pipes.

(2-1-1) Compressor 11

The compressor 11 sucks and compresses a low-pressure gas refrigerant to produce a high-pressure gas refrigerant. The compressor 11 includes a compressor motor 11a. The compressor motor 11a generates motive power necessary for compression.

(2-1-2) Four-Way switching Valve 12

The four-way switching valve 12 switches connection of the inner pipes. When the air conditioner 100 executes cooling operation, the four-way switching valve 12 achieves connection depicted by solid lines in FIG. 1. When the air conditioner 100 executes heating operation, the four-way switching valve 12 achieves connection depicted by broken lines in FIG. 1.

(2-1-3) Outdoor Heat Exchanger 13

The outdoor heat exchanger 13 executes heat exchange between the refrigerant and a medium. The medium is typically air but may be water or brine. During cooling operation, the outdoor heat exchanger 13 functions as a heat radiator (or a condenser). During heating operation, the outdoor heat exchanger 13 functions as a heat absorber (or an evaporator).

(2-1-4) Outdoor Fan 14

The outdoor fan 14 accelerates heat exchange by the outdoor heat exchanger 13. The outdoor fan 14 includes an outdoor fan motor 14a. The outdoor fan motor 14a generates motive power necessary for moving the medium such as air.

(2-1-5) Expansion Valve 15

The expansion valve 15 has an adjustable opening degree. The expansion valve 15 decompresses the refrigerant. The expansion valve 15 further controls a flow rate of the refrigerant.

(2-1-6) Liquid Shutoff Valve 17

The liquid shutoff valve 17 is configured to shut off a refrigerant flow path. The liquid shutoff valve 17 is closed by an installation worker upon installation of the air conditioner 100, for example.

(2-1-7) Gas Shutoff Valve 18

The gas shutoff valve 18 is configured to shut off the refrigerant flow path. The gas shutoff valve 18 is closed by an installation worker upon installation of the air conditioner 100, for example.

(2-1-8) Inner Pipes

The inner pipes include a discharge pipe 16a, a gas side pipe 16b, a liquid side pipe 16c, a liquid side pipe 16d, a gas side pipe 16e, and a suction pipe 16f.

The discharge pipe 16a connects a discharge port of the compressor 11 and the four-way switching valve 12. The gas side pipe 16b connects the four-way switching valve 12 and the outdoor heat exchanger 13. The liquid side pipe 16c connects the outdoor heat exchanger 13 and the expansion valve 15. The liquid side pipe 16d connects the expansion valve 15 and the liquid shutoff valve 17. The gas side pipe 16e connects the gas shutoff valve 18 and the four-way switching valve 12. The suction pipe 16f connects the four-way switching valve 12 and a suction port of the compressor 11.

(2-1-9) Outdoor Control Unit 19

The outdoor control unit 19 includes a microcomputer and a memory. The outdoor control unit 19 controls the compressor motor 11a, the four-way switching valve 12, the outdoor fan motor 14a, the expansion valve 15, and the like. The memory stores software for control of these parts.

(2-2) Indoor Unit 20

The indoor unit 20 conditions air in the room where a user stays. The indoor unit 20 includes an indoor heat exchanger 22, an indoor fan 23, and an indoor control unit 29. The outdoor unit further includes a plurality of inner pipes.

(2-2-1) Indoor Heat Exchanger 22

The indoor heat exchanger 22 executes heat exchange between the refrigerant and air. During cooling operation, the indoor heat exchanger 22 functions as a heat absorber (or an evaporator). During heating operation, the indoor heat exchanger 22 functions as a heat radiator (or a condenser).

(2-2-2) Indoor Fan 23

The indoor fan 23 accelerates heat exchange by the indoor heat exchanger 22. The indoor fan 23 includes an indoor fan motor 23a. The indoor fan motor 23a generates motive power necessary for moving air.

(2-2-3) Inner Pipes

The inner pipes include a liquid side pipe 26a and a gas side pipe 26b. The liquid side pipe 26a connects a liquid connection piping 31 to be described later and the indoor heat exchanger 22. The gas side pipe 26b connects the indoor heat exchanger 22 and a gas connection piping 32 to be described later.

(2-2-4) Indoor Control Unit 29

The indoor control unit 29 includes a microcomputer and a memory. The indoor control unit 29 controls the indoor fan motor 23a and the like. The memory stores software for control of these parts.

The indoor control unit 29 transmits and receives data and commands to and from the outdoor control unit 19 via a communication line L.

(2-3) Connection Piping 30

The connection piping 30 guides the refrigerant moving between the outdoor unit 10 and the indoor unit 20. The connection piping 30 includes a liquid connection pipe 31 and a gas connection pipe 32.

(2-3-1) Liquid Connection Pipe 31

The liquid connection pipe 31 principally guides a liquid refrigerant or a gas-liquid two-phase refrigerant. The liquid connection pipe 31 connects the liquid shutoff valve 17 and the liquid side pipe 26a.

(2-3-2) Gas Connection Pipe 32

The gas connection pipe 32 principally guides a gas refrigerant. The gas connection pipe 32 connects the gas shutoff valve 18 and the gas side pipe 26b.

(3) Overall Operation

The following description assumes that the refrigerant experiences phase transition such as condensation or evaporation at the outdoor heat exchanger 13 and the indoor heat exchanger 22. Alternatively, the refrigerant may not necessarily experience phase transition at the outdoor heat exchanger 13 and the indoor heat exchanger 22.

(3-1) Cooling Operation

During cooling operation, the refrigerant circulates in a direction indicated by arrow C in FIG. 1. The compressor 11 discharges the high-pressure gas refrigerant in a direction indicated by arrow D in FIG. 1. The high-pressure gas refrigerant then passes through the discharge pipe 16a, the four-way switching valve 12, and the gas side pipe 16b to reach the outdoor heat exchanger 13. At the outdoor heat exchanger 13, the high-pressure gas refrigerant condenses to change into a high-pressure liquid refrigerant. The high-pressure liquid refrigerant then passes through the liquid side pipe 16c to reach the expansion valve 15. At the expansion valve 15, the high-pressure liquid refrigerant is decompressed to change into a low-pressure gas-liquid two-phase refrigerant. The low-pressure gas-liquid two-phase refrigerant then passes through the liquid side pipe 16d, the liquid shutoff valve 17, the liquid connection pipe 31, and the liquid side pipe 26a to reach the indoor heat exchanger 22. At the indoor heat exchanger 22, the low-pressure gas-liquid two-phase refrigerant evaporates to change into a low-pressure gas refrigerant. This process lowers the temperature of the air in the room where the user stays. The low-pressure gas refrigerant then passes through the gas side pipe 26b, the gas connection pipe 32, the gas shutoff valve 18, the gas side pipe 16e, the four-way switching valve 12, and the suction pipe 16f to reach the compressor 11. The compressor 11 then sucks the low-pressure gas refrigerant.

(3-2) Heating Operation

During heating operation, the refrigerant circulates in a direction indicated by arrow H in FIG. 1. The compressor 11 discharges the high-pressure gas refrigerant in the direction indicated by arrow D in FIG. 1. The high-pressure gas refrigerant then passes through the discharge pipe 16a, the four-way switching valve 12, the gas side pipe 16e, the gas shutoff valve 18, the gas connection pipe 32, and the gas side pipe 26b to reach the indoor heat exchanger 22. At the indoor heat exchanger 22, the high-pressure gas refrigerant condenses to change into a high-pressure liquid refrigerant. This process rises the temperature of the air in the room where the user stays. The high-pressure liquid refrigerant then passes through the liquid side pipe 26a, the liquid connection pipe 31, the liquid shutoff valve 17, and the liquid side pipe 16d to reach the expansion valve 15. At the expansion valve 15, the high-pressure liquid refrigerant is decompressed to change into a low-pressure gas-liquid two-phase refrigerant. The low-pressure gas-liquid two-phase refrigerant then passes through the liquid side pipe 16c to reach the outdoor heat exchanger 13. At the outdoor heat exchanger 13, the low-pressure gas-liquid two-phase refrigerant evaporates to change into a low-pressure gas refrigerant. The low-pressure gas refrigerant then passes through the gas side pipe 16b, the four-way switching valve 12, and the suction pipe 16f to reach the compressor 11. The compressor then sucks the low-pressure gas refrigerant.

(4) Detailed Configuration of Outdoor Heat Exchanger 13

(4-1) Overall Configuration of Outdoor Heat Exchanger 13

Figure 2:
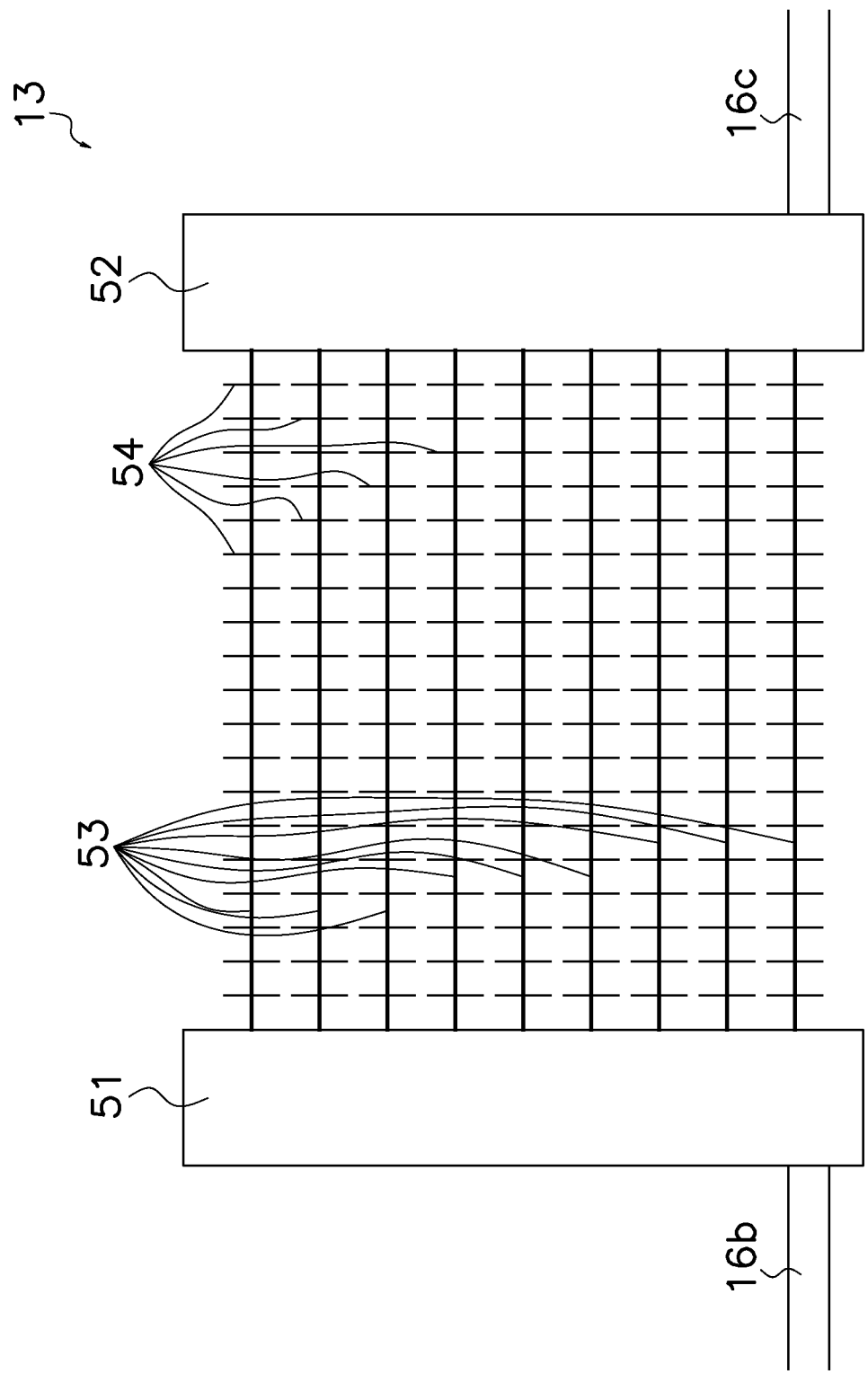
FIG. 2 is a schematic diagram depicting a configuration of an outdoor heat exchanger 13.

FIG. 2 depicts a configuration of the outdoor heat exchanger 13. The outdoor heat exchanger 13 includes a gas side header 51, a liquid side header 52, and an assembly of heat transfer tubes 53 and fins 54.

The gas side header 51 is connected to the gas side pipe 16b. The liquid side header 52 is connected to the liquid side pipe 16c. Each of the heat transfer tubes 53 connects the gas side header 51 and the liquid side header 52. A large number of fins 54 are installed at the heat transfer tubes 53 for improvement in heat exchange efficiency.

During cooling operation, the gas side header 51 distributes the high-pressure gas refrigerant to the plurality of heat transfer tubes 53. The high-pressure gas refrigerant condenses while passing through the heat transfer tubes 53, and releases heat energy to the medium such as air in the process. The liquid side header 52 collects the high-pressure liquid refrigerant from the plurality of heat transfer tubes 53.

During heating operation, the liquid side header 52 distributes the low-pressure gas-liquid two-phase refrigerant to the plurality of heat transfer tubes 53. The low-pressure gas-liquid two-phase refrigerant evaporates while passing through the heat transfer tubes 53, and absorbs heat energy from the medium such as air in the process. The gas side header 51 collects the low-pressure gas refrigerant from the plurality of heat transfer tubes 53.

(4-2) Configuration of Liquid side Header 52

Figure 3:
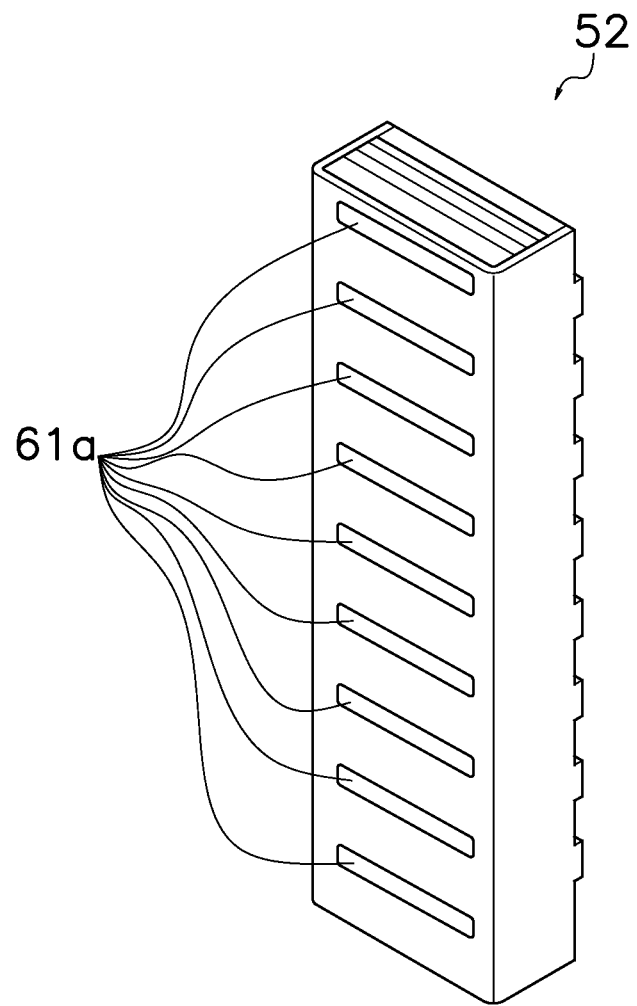
FIG. 3 is an external view of a liquid side header 52.

FIG. 3 depicts an external view of the liquid side header 52. The liquid side header 52 is provided with a plurality of holes 61a for connection of the heat transfer tubes 53.

Figure 4:
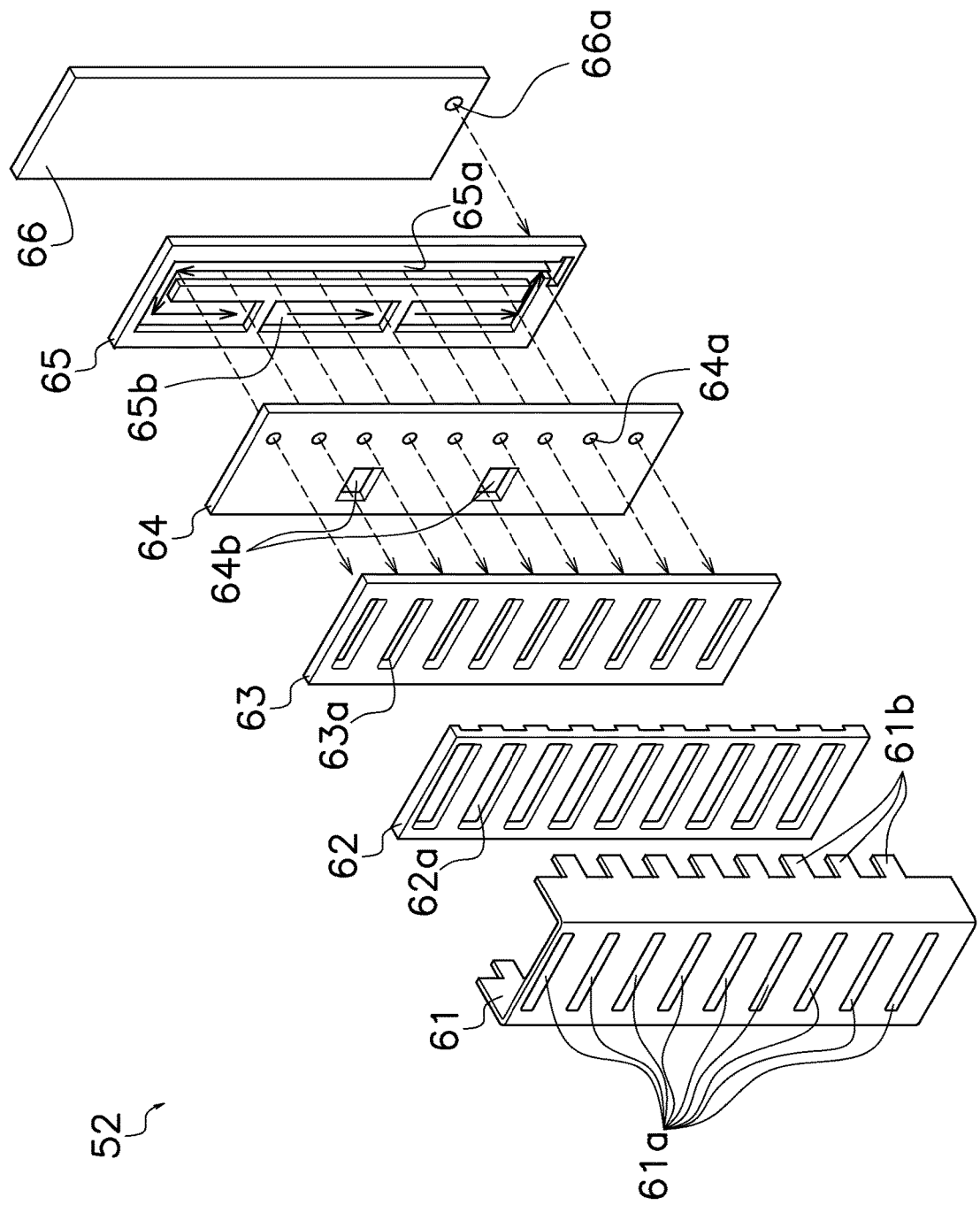
FIG. 4 is an exploded perspective view of the liquid side header 52.

FIG. 4 is an exploded view of the liquid side header 52. The liquid side header 52 is constituted as a stacked header including a plurality of stacked plate-shaped bodies. The plurality of plate-shaped bodies includes an outer board 61, an inner board 62, an inner board 63, an inner board 64, an inner board 65, and an outer board 66.

The outer board 61 has a C shaped section, and surrounds the inner board 62, the inner board 63, the inner board 64, the inner board 65, and the outer board 66. The outer board 61 has the plurality of holes 61a to receive the heat transfer tubes 53. The outer board 61 further includes a plurality of swage claws 61b to retain the inner board 62, the inner board 63, the inner board 64, the inner board 65, and the outer board 66. The swage claws 61b are bent inward in a step of manufacturing the liquid side header 52.

The inner board 62 has a plurality of holes 62a. Each of the holes 62a communicates with a corresponding one of the holes 61a.

The inner board 63 has a plurality of holes 63a. Each of the holes 63a communicates with a corresponding one of the holes 62a.

The inner board 64 has a plurality of holes 64a and a plurality of holes 64b. Each of the holes 64a communicates with a corresponding one of the holes 63a. However, the holes 64b do not communicate with the holes 63a.

The inner board 65 has a refrigerant flow path 65a having a C shape and a refrigerant flow path 65b having an I shape. The refrigerant flow path 65a communicates with all the holes 64a. The refrigerant flow path 65a and the refrigerant flow path 65b each communicate with the holes 64b.

The outer board 66 is provided with a hole 66a for connection of the liquid side pipe 16c. The hole 66a communicates with the refrigerant flow path 65a.

Figure 5:
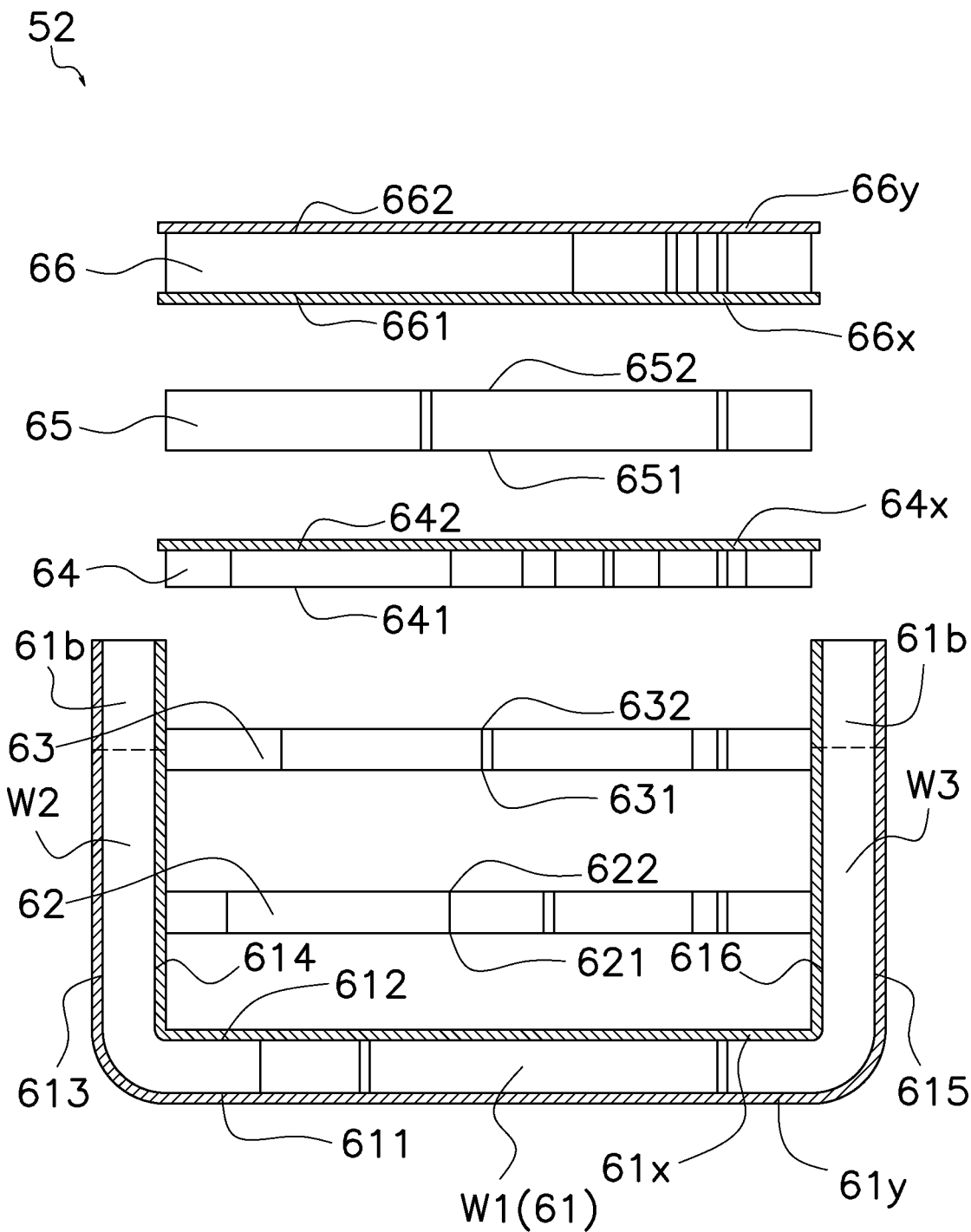
FIG. 5 is an exploded sectional view of the liquid side header 52.

(4-3) Manufacture of Liquid Side Header 52
(4-3-1) Preparation of Plate-Shaped Body FIG. 5 is a sectional view depicting a step of manufacturing the liquid side header 52.

The outer board 61 to be prepared includes a first wall W1, a second wall W2, and a third wall W3. The outer board 61 is a double-sided cladded material. Specifically, a first wall inner surface 612, a second wall inner surface 614, and a third wall inner surface 616 are each provided with a brazing material 61x, and a first wall outer surface 611, a second wall outer surface 613, and a third wall outer surface 615 are each provided with a brazing material 61y. The brazing material 61x is not mixed with any corrosion preventive. The brazing material 61y is mixed with a corrosion preventive such as zinc.

The inner board 62 to be prepared is a bare material. Specifically, neither a surface 621 nor a surface 622 is provided with any brazing material.

The inner board 63 to be prepared is a bare material. Specifically, neither a surface 631 nor a surface 632 is provided with any brazing material.

The inner board 64 to be prepared is a single-sided cladded material. Specifically, a surface 641 is not provided with any brazing material, whereas a surface 642 is provided with a brazing material 64x. The brazing material 64x is not mixed with any corrosion preventive.

The inner board 65 to be prepared is a bare material. Specifically, neither a surface 651 nor a surface 652 is provided with any brazing material.

The outer board 66 to be prepared is a double-sided cladded material. Specifically, a surface 661 is provided with a brazing material 66x, and a surface 662 is provided with a brazing material 66y. The brazing material 66x is not mixed with any corrosion preventive. The brazing material 66y is mixed with a corrosion preventive such as zinc.

A half or more (i.e. the inner board 62, the inner board 63, and the inner board 65) of the plurality of plate-shaped bodies (i.e. the outer board 61, the inner board 62, the inner board 63, the inner board 64, the inner board 65, and the outer board 66) are not provided with brazing material.

(4-3-2) Application of Flux

Flux is applied to the surfaces without brazing material (i.e. the surface 621, the surface 622, the surface 631, the surface 632, the surface 641, the surface 651, and the surface 652).

(4-3-3) Disposition of Plate-Shaped Bodies

The inner board 62, the inner board 63, the inner board 64, the inner board 65, and the outer board 66 are arranged in the outer board 61. In this arrangement, the surface 622 and the surface 631 facing each other are not provided with brazing material. Furthermore, the surface 632 and the surface 641 facing each other are not provided with brazing material.

Both the second wall inner surface 614 and the third wall inner surface 616 each provided with the brazing material 61x are in contact with the inner board 62, the inner board 63, the inner board 64, and the like.

The plurality of swage claws 61b is subsequently bent inward.

(4-3-4) Furnace Brazing

The stacked plate-shaped bodies are heated in a furnace. The brazing material 61x, the brazing material 64x, and the brazing material 66x accordingly melt to join the plate-shaped bodies that are adjacently arranged with each other.

Figure 6:
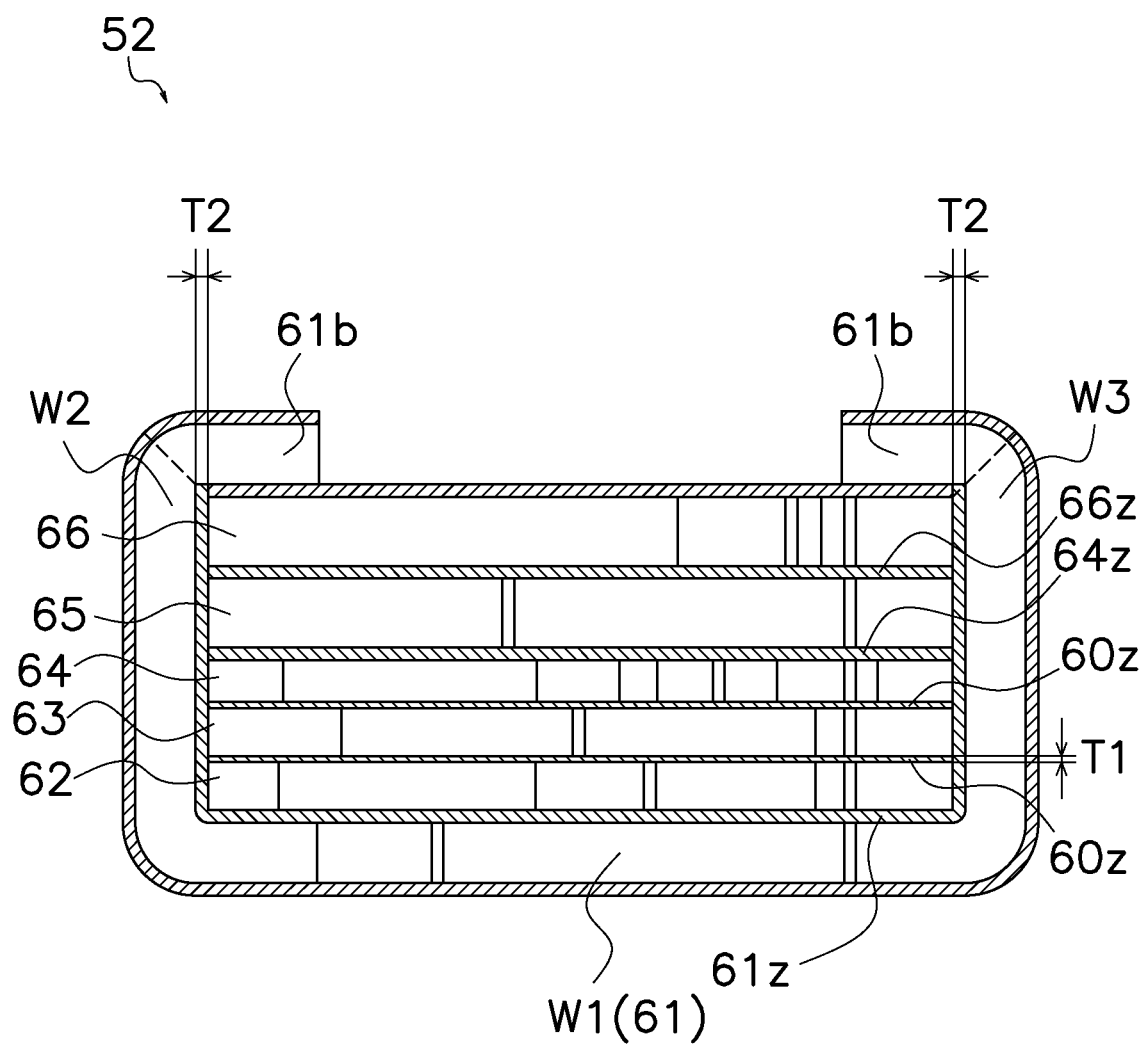
FIG. 6 is a sectional view of the liquid side header 52 after completion of brazing.

FIG. 6 is a sectional view of the liquid side header 52 after completion of brazing. The brazing material 61x, the brazing material 64x, and the brazing material 66x have moved partially due to the melt. Therefore, the brazing materials have changed in thickness in comparison to a stage of preparing the plate-shaped bodies. Specifically, the brazing material 61x has changed in thickness to become a brazing material 61z. The brazing material 64x has changed in thickness to become a brazing material 64y. The brazing material 66x has changed in thickness to become a brazing material 66z.

The brazing material 60z has been interposed between the inner board 62 and the inner board 63. Furthermore, the brazing material 60z has been interposed between the inner board 63 and the inner board 64. The brazing material 60z provided at each of these locations has been obtained when the brazing material 61x melts and enters the gap and then solidifies.

Assuming that the brazing material 60z has a first thickness T1 and the brazing material 61z has a second thickness T2, the first thickness T1 is less than the second thickness T2. The first thickness is 0.2 mm or less, for example.

(5) Characteristics (5-1)

The plurality of swage claws 61b of the outer board 61 is bent inward prior to furnace brazing to fix the plurality of plate-shaped bodies. However, if many of the plate-shaped bodies are preliminarily provided with the brazing material, the brazing material melts to form a gap between the plurality of plate-shaped bodies. Despite the fact that the plate-shaped bodies are fixed by the swage claws 61b prior to furnace brazing, the refrigerant may leak from the liquid side header 52 after furnace brazing.

In contrast, according to one or more embodiments, the brazing materials 61x provided on the second wall inner surface 614 and the third wall inner surface 616 enter the gap between the surface 622 and the surface 631. The surface 622 and the surface 631 can thus be joined without preliminarily disposing any brazing material between the surface 622 and the surface 631, so that the inner board 62 and the inner board 63 are less likely to shift relatively and the liquid side header 52 is less likely to suffer from refrigerant leakage.

(5-2)

The brazing material 60z disposed between the surface 622 and the surface 631 is 0.2 mm or less in thickness. The inner board 62 and the inner board 63 are thus less likely to shift relatively.

(5-3)

Neither the inner board 62 nor the inner board 63 is provided with brazing material. There is thus no need to provide a step of applying brazing material, which leads to reduction in cost for the outdoor heat exchanger 13.

(5-4)

A half or more (i.e. the inner board 62, the inner board 63, and the inner board 65) of the plurality of plate-shaped bodies (i.e. the outer board 61, the inner board 62, the inner board 63, the inner board 64, the inner board 65, and the outer board 66) are not provided with brazing material. The plate-shaped bodies are thus less likely to shift in a step of furnace brazing.

(5-5)

Flux is applied to the surface 622 and the surface 631 without brazing material. This leads to removal of an oxide layer generated on each of the surface 622 and the surface 631 without brazing material, and a brazing material is thus likely to be introduced from other members.

(5-6)

The inner board 62 and the inner board 63 are surrounded by the outer board 61 having the C shape. The liquid side header 52 is thus less likely to suffer from refrigerant leakage.

(6) Modification Examples (6-1) Modification Example 1A

The heat exchanger according to the embodiments described above is the outdoor heat exchanger 13. Alternatively, the configuration and the manufacturing method described above may be applied to the indoor heat exchanger 22.

(6-2) Modification Example 1B

In the liquid side header 52 according to the embodiments described above, three (i.e. the inner board 62, the inner board 63, and the inner board 65) of the four inner boards (i.e. the inner board 62, the inner board 63, the inner board 64, and the inner board 65) are bare materials provided with no brazing material. Alternatively, all the four inner boards (i.e. the inner board 62, the inner board 63, the inner board 64, and the inner board 65) may be bare materials.

(6-3) Modification Example 1C

The liquid side header 52 according to the embodiments described above includes four inner boards. Alternatively, the number of the inner boards may be other than four. For example, there may be provided two, three, or five inner boards.

Second Embodiments (1) Configuration

Figure 7:
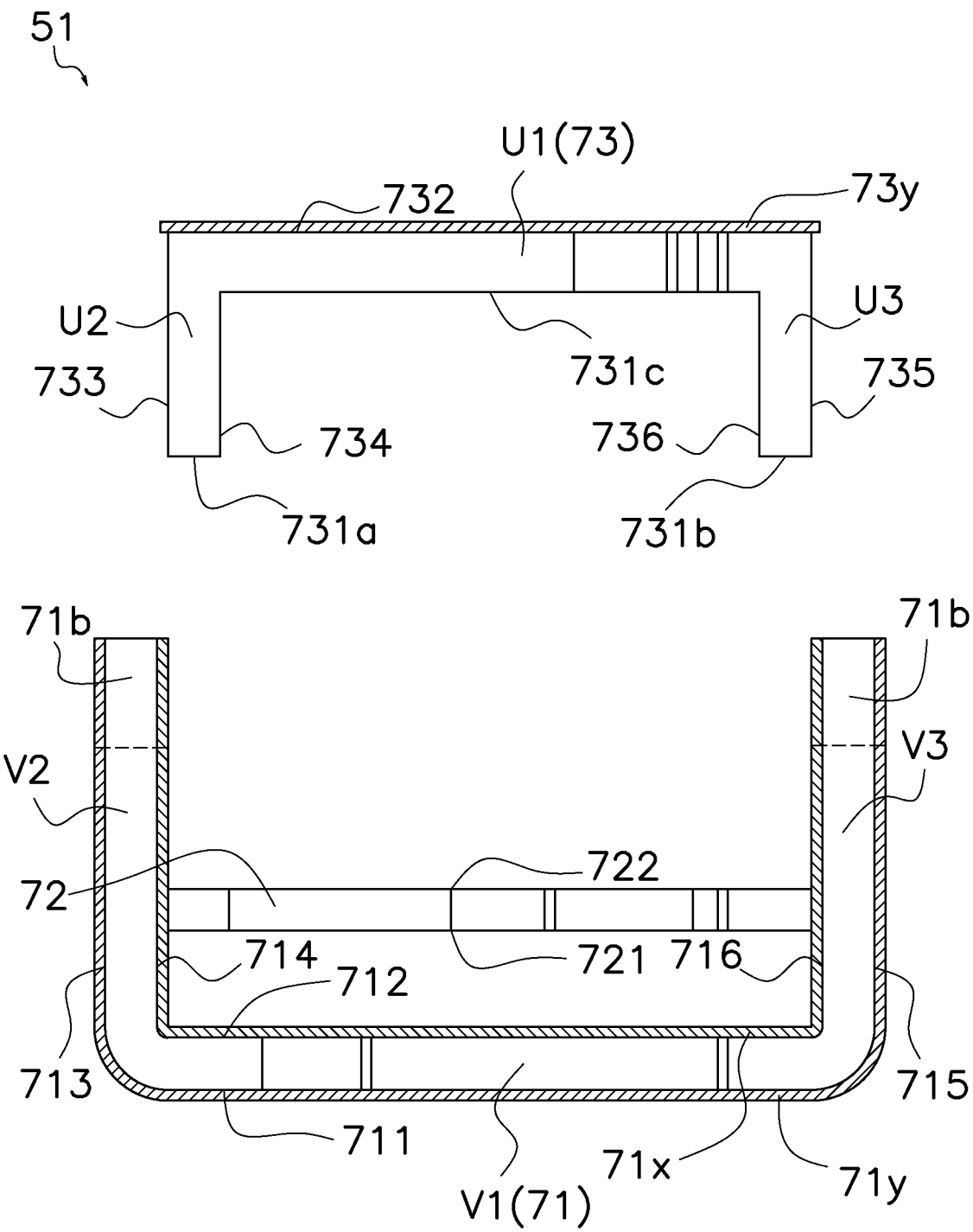
FIG. 7 is an exploded sectional view of a gas side header 51.

FIG. 7 is a sectional view depicting a step of manufacturing the gas side header 51 in the outdoor heat exchanger 13 in FIG. 2. The gas side header 51 is also constituted as a stacked header including a plurality of stacked plate-shaped bodies. The plurality of plate-shaped bodies includes an outer board 71, an inner board 72, and an outer board 73.

The outer board 71 to be prepared includes a first wall V1, a second wall V2, and a third wall V3. The second wall V2 and the third wall V3 are each provided with a swage claw 71b. The outer board 71 is a double-sided cladded material. Specifically, a first wall inner surface 712, a second wall inner surface 714, and a third wall inner surface 716 are each provided with a brazing material 71x, and a first wall outer surface 711, a second wall outer surface 713, and a third wall outer surface 715 are each provided with a brazing material 71y. The brazing material 71x is not mixed with any corrosion preventive. The brazing material 71y is mixed with a corrosion preventive such as zinc.

The inner board 62 to be prepared is a bare material. Specifically, neither a surface 721 nor a surface 722 is provided with brazing material.

The outer board 73 to be prepared includes a first wall U1, a second wall U2, and a third wall U3. The outer board 73 is a single-sided cladded material. Specifically, a surface 731a, a surface 731b, a surface 731c, a surface 733, a surface 734, a surface 735, and a surface 736 are not provided with brazing material, whereas a surface 732 is provided with a brazing material 73y. The brazing material 73y is mixed with a corrosion preventive such as zinc.

The stacked plate-shaped bodies are heated in a furnace. The brazing material 71x accordingly melts to join the plate-shaped bodies that are adjacently arranged with each other.

The surface 722 of the inner board 72 is not provided with brazing material. On the outer board 73, neither the surface 731a nor the surface 731b facing the surface 722 is provided with brazing material. As in the embodiments described above, the brazing material 71x melts and partially enters the gap between the surface 722 and the surface 731a as well as the gap between the surface 722 and the surface 731b to solidify.

(2) Characteristics

The surface 722 and the surface 731a as well as the surface 722 and the surface 731b can be joined without preliminarily disposing brazing material in the gap between the surface 722 and the surface 731a as well as the gap between the surface 722 and the surface 731b, so that the inner board 72 and the outer board 73 are less likely to shift relatively and the gas side header 51 is less likely to suffer from refrigerant leakage.

(3) Modification Example

The heat exchanger according to the embodiments described above is the outdoor heat exchanger 13. Alternatively, the configuration and the manufacturing method described above may be applied to the indoor heat exchanger 22.

<Closing>

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

10: outdoor unit
13: outdoor heat exchanger (heat exchanger)
20: indoor unit
22: indoor heat exchanger
51: gas side header
52: liquid side header (header)
53: heat transfer tube (heat transfer member)
54: fin (heat transfer member)
60z: brazing material
61: outer board (third member)
61x: brazing material
61y: brazing material
61z: brazing material
62: inner board (first member)
63: inner board (second member)
64: inner board
64x: brazing material
64y: brazing material
65: inner board
66: outer board (member)
66x: brazing material
66y: brazing material
66z: brazing material
71: outer board
71x: brazing material
71y: brazing material
72: inner board
73: outer board
73y: brazing material
100: air conditioner
611: first wall outer surface
612: first wall inner surface
613: second wall outer surface
614: second wall inner surface (third surface)
615: third wall outer surface
616: third wall inner surface (third surface)
621: surface (fourth surface)
622: surface (first surface)
631: surface (second surface)
632: surface (fifth surface)
711: first wall outer surface
712: first wall inner surface
713: second wall outer surface
714: second wall inner surface
715: third wall outer surface
716: third wall inner surface T1: first thickness (first thickness)
T2: second thickness (second thickness, third thickness)

PATENT LITERATURE

Patent Literature 1: WO 2015/004719 A

What is claimed is:

1. A heat exchanger comprising:
a header that guides a refrigerant; and
an assembly of heat transfer tubes and fins that is connected to the header and that causes heat exchange between the refrigerant and a medium, wherein
the header comprises:
a first member having a first surface;
a second member having a second surface that faces the first surface; and
a third member having a third surface that intersects with the first surface and the second surface,
the first surface is joined with the second surface by a first brazing material having a first thickness,
the third surface is joined with the first member by a second brazing material having a second thickness,
the third surface is joined with the second member by the second brazing material,
the first thickness is less than the second thickness, and
the first thickness is 0.2 mm or less.

2. The heat exchanger according to claim 1, wherein the third member has a C shaped section and surrounds the first member and the second member.

3. A heat exchanger comprising:
a header that guides a refrigerant; and
an assembly of heat transfer tubes and fins that is connected to the header and that causes heat exchange between the refrigerant and a medium, wherein
the header comprises:
a first member having a first surface that has no brazing material applied thereto;
a second member disposed next to the first member and having a second surface, wherein the second surface faces the first surface and has no brazing material applied thereto, and
a third member having a third surface, wherein the third surface intersects with both the first surface and the second surface and has a brazing material applied thereto, and
the first surface is joined with the second surface by the brazing material that has been applied to the third surface and fills a gap between the first surface and the second surface.

4. The heat exchanger according to claim 3, wherein the gap is 0.2 mm or less in thickness.

5. The heat exchanger according to claim 3, wherein
the first member has a fourth surface opposite to the first surface and that has no brazing material applied thereto, and
the second member has a fifth surface opposite to the second surface and that has no brazing material applied thereto.

6. The heat exchanger according to claim 3, wherein the header further comprises header constituent members, and
a half or more of the first member, the second member, the third member, and the header constituent members have no brazing material applied thereto.

7. The heat exchanger according to claim 6, wherein
at least one of the header constituent members has a brazing material applied thereto, and the third member and the at least one of the header constituent members are disposed on both sides of the first member and the second member in a direction intersecting with the first surface and the second surface.

8. The heat exchanger according to claim 3, wherein the first surface and the second surface have flux applied thereto.

* * * * *